(12) United States Patent
Koruga

(10) Patent No.: US 11,067,730 B2
(45) Date of Patent: Jul. 20, 2021

(54) OPTICAL FILTER AND METHOD OF MANUFACTURING AN OPTICAL FILTER

(71) Applicant: FIELDPOINT (CYPRUS) LTD., Nicosia (CY)

(72) Inventor: Djuro Koruga, Belgrad (RS)

(73) Assignee: Fieldpoint (Cyprus) Limited

( * ) Notice: Subject to any disclaimer, the term of this patent is extended or adjusted under 35 U.S.C. 154(b) by 52 days.

(21) Appl. No.: 16/308,093

(22) PCT Filed: Jun. 9, 2016

(86) PCT No.: PCT/EP2016/063174
§ 371 (c)(1),
(2) Date: Dec. 7, 2018

(87) PCT Pub. No.: WO2017/211420
PCT Pub. Date: Dec. 14, 2017

(65) Prior Publication Data
US 2019/0257989 A1    Aug. 22, 2019

(51) Int. Cl.
*G02B 5/20* (2006.01)
*G02B 5/30* (2006.01)
*B82Y 20/00* (2011.01)

(52) U.S. Cl.
CPC ............. *G02B 5/206* (2013.01); *G02B 5/208* (2013.01); *G02B 5/3025* (2013.01); *B82Y 20/00* (2013.01)

(58) Field of Classification Search
CPC ....... G02B 5/206; G02B 5/208; G02B 5/3025
See application file for complete search history.

(56) References Cited

U.S. PATENT DOCUMENTS

| | | | |
|---|---|---|---|
| 3,117,177 A | 1/1964 | Kahn et al. | |
| 4,548,473 A | 10/1985 | Lo et al. | |
| 6,066,272 A | 5/2000 | Tang et al. | |
| 6,565,982 B1 * | 5/2003 | Ouderkirk | B32B 17/10018 428/457 |
| 6,982,117 B2 * | 1/2006 | Smith | B32B 27/20 428/323 |
| 2007/0076166 A1 * | 4/2007 | Kobuchi | G02C 7/10 351/151 |
| 2008/0219917 A1 | 9/2008 | Koruga | |
| 2008/0286453 A1 | 11/2008 | Koruga | |
| 2011/0001252 A1 | 1/2011 | Korbuchi et al. | |

(Continued)

FOREIGN PATENT DOCUMENTS

| | | |
|---|---|---|
| CN | 101017215 A | 8/2007 |
| CN | 101266399 | 9/2008 |
| CN | 101808670 | 8/2010 |

(Continued)

OTHER PUBLICATIONS

Arndt, et al., "Wave—particle duality of C60 molecules", Nature, vol. 401, Oct. 14, 1999, pp. 680-682.

(Continued)

*Primary Examiner* — Robert E. Tallman
(74) *Attorney, Agent, or Firm* — Barnes & Thornburg LLP; Jeffrey R. Stone

(57) ABSTRACT

An optical filter may include a substrate made of a material including an optically transparent matrix material and nanophotonic material with icosahedral or dodecahedral symmetry dispersed in the matrix material.

15 Claims, 15 Drawing Sheets

(56) References Cited

U.S. PATENT DOCUMENTS

2014/0334000 A1    11/2014    Clerc et al.

FOREIGN PATENT DOCUMENTS

| | | |
|---|---|---|
| CN | 103941480 | 7/2014 |
| CN | 104054017 | 9/2014 |
| CN | 104203527 | 12/2014 |
| DE | 3220218 | 3/1983 |
| DE | 60212345 | 2/2002 |
| EP | 0320080 | 6/1989 |
| EP | 0573905 | 12/1993 |
| JP | 2011504456 | 2/2011 |
| JP | 2014532194 | 12/2014 |
| KR | 20110120718 | 11/2011 |
| WO | 9604958 | 2/1996 |
| WO | 9604959 | 2/1996 |
| WO | 2008/097922 A2 | 8/2008 |
| WO | 2009/089292 | 7/2009 |
| WO | 2017/211420 | 12/2017 |

OTHER PUBLICATIONS

Dal Negro, et al., "Light Transport through the Band-Edge States of Fibonacci Quasicrystals", The American Physical Society, vol. 90, No. 5, Feb. 7, 2003, pp. 1-4.

Koruga, et al., "Epidermal Layers Characterisation by Opto-Magnetic Spectroscopy Based on Digital Image of Skin", Acta Physica Polonica, vol. 121 (2012), No. 3, pp. 606-610.

Koruga, et al., "Fibonacci Signalling in Biomolecular Systems: Synergy of Structure, Energy and Information in Human Body", Mini-symposium "Biomechanics and Modelling of Biological Systems", Mathematical Institute of SASA and Project OI 174001, Belgrade, Serbia, Dec. 7, 2016, p. 38.

Koruga, et al., Gibbson: "Peptide Plain as a Unique Biological Nanostructure", Materials Science Forum, vol. 453-454, pp. 523-533, 2004.

Koruga, et al., "Water Hydrogen Bonds Study by Opto-Magnetic Fingerprint Technique", Acta Physica Polonica A, vol. 117, (2010), No. 5, pp. 777-781.

Matija, et al., "Nanophysical approach to diagnosis of epithelial tissues using Opto-magnetic imaging spectroscopy", Nanomedicine, pp. 156-.

Papic-Obradovic, et al., "Opto-Magnetic Method for Epstein-Barr Virus and Cytomegalovirus Detection in Blood Plasma Samples", ACTA Physica Polonica A, vol. 117 (2010), No. 5, pp. 782-785.

Rakocevic, "A harmonic structure of the genetic code", Journal of Theoretical Biology, 229, (2004), pp. 221-234.

Rakocevic, "Further generalization of Golden Mean in Relation to Euler's "Divine" Equation", Faculty of Mecanical Engineering, Belgrade, FME Transactions (2004) 32, pp. 95-98.

Rakocevic, "The genetic code as a Golden mean determined system", BioSystems, 46, (1998), pp. 283-291.

Tomic, et al., "Application of the LaGrange Equation to the Oscillation of the Peptide Plain in Amino-Acids Chain", Facta Universitatis, Series: Mechanics, Automatic Control and Robotics, vol. 4, No. 16, 2004, pp. 157-166.

Final Rejection issued by the Japanese Patent Office for Application No. 2018-563590, dated Aug. 4, 2020. Full English translation attached.

Examination report No. 1 issued by Australian Patent Office, dated May 8, 2020, application No. 2019216674.

Office Action issued by Intellectual Property India, dated Dec. 12, 2020. English translation included.

Office Action issued by the New Zealand Patent Office in Application No. 760763, dated Oct. 20, 2020.

Office Action issued by the Japanese Patent Office, application No. P2018-563590, dated Jan. 19, 2021.

* cited by examiner

| $I/I_h$ | $E$ | $12C_5$ | $12C_5^2$ | $20C_3$ | $15C_2$ | $i$ | $12S_{10}$ | $12S_{10}^3$ | $20S_6$ | $15\sigma$ | III | IV | |
|---|---|---|---|---|---|---|---|---|---|---|---|---|---|
| $A_g$ | 1 | 1 | 1 | 1 | 1 | 1 | 1 | 1 | 1 | 1 | | $x^2+y^2+z^2$ | |
| $T_{1g}$ | 3 | $\tfrac{1}{2}(1+\sqrt{5})$ | $\tfrac{1}{2}(1-\sqrt{5})$ | 0 | $-1$ | 3 | $\tfrac{1}{2}(1-\sqrt{5})$ | $\tfrac{1}{2}(1+\sqrt{5})$ | 0 | $-1$ | $(R_x,R_y,R_z)$ | | |
| $T_{2g}$ | 3 | $\tfrac{1}{2}(1-\sqrt{5})$ | $\tfrac{1}{2}(1+\sqrt{5})$ | 0 | $-1$ | 3 | $\tfrac{1}{2}(1+\sqrt{5})$ | $\tfrac{1}{2}(1-\sqrt{5})$ | 0 | $-1$ | | | |
| $G_g$ | 4 | $-1$ | $-1$ | 1 | 0 | 4 | $-1$ | $-1$ | 1 | 0 | | | |
| $H_g$ | 5 | 0 | 0 | $-1$ | 1 | 5 | 0 | 0 | $-1$ | 1 | | $(2z^2-x^2-y^2,$ $x^2-y^2,$ $xy, yz, zx)$ | |
| $A_u$ | 1 | 1 | 1 | 1 | 1 | $-1$ | $-1$ | $-1$ | $-1$ | $-1$ | | | |
| $T_{1u}$ | 3 | $\tfrac{1}{2}(1+\sqrt{5})$ | $\tfrac{1}{2}(1-\sqrt{5})$ | 0 | $-1$ | $-3$ | $-\tfrac{1}{2}(1-\sqrt{5})$ | $-\tfrac{1}{2}(1+\sqrt{5})$ | 0 | 1 | $(x,y,z)$ | | |
| $T_{2u}$ | 3 | $\tfrac{1}{2}(1-\sqrt{5})$ | $\tfrac{1}{2}(1+\sqrt{5})$ | 0 | $-1$ | $-3$ | $-\tfrac{1}{2}(1+\sqrt{5})$ | $-\tfrac{1}{2}(1-\sqrt{5})$ | 0 | 1 | | | $(x^3,y^3,z^3)$ $[x(z^2-y^2),y(z^2-x^2),$ $z(x^2-y^2),xyz]$ |
| $G_u$ | 4 | $-1$ | $-1$ | 1 | 0 | $-4$ | 1 | 1 | $-1$ | 0 | | | |
| $H_u$ | 5 | 0 | 0 | $-1$ | 1 | $-5$ | 0 | 0 | 1 | $-1$ | | | |

FIG. 3

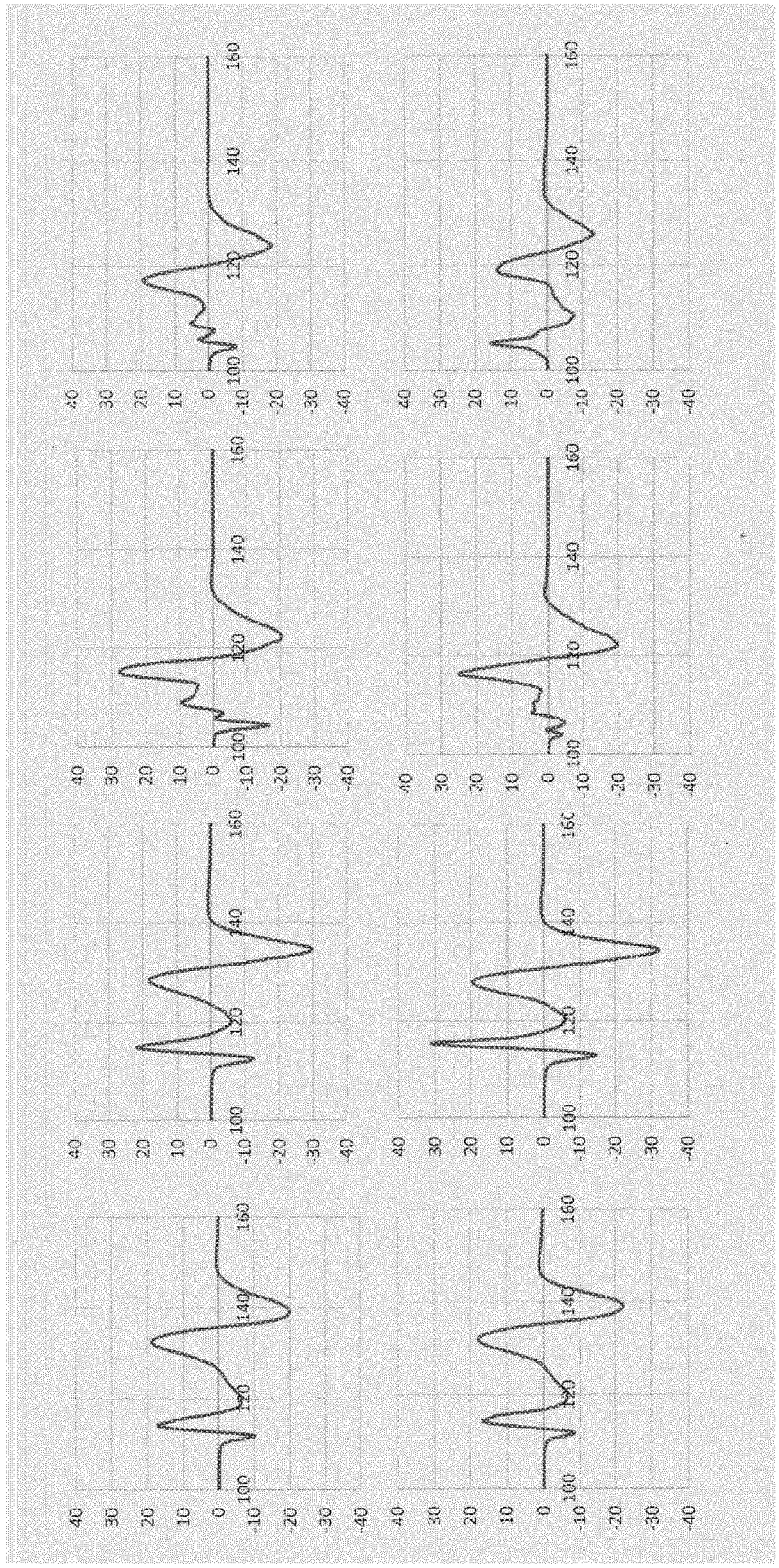

US 11,067,730 B2

OPTICAL FILTER AND METHOD OF MANUFACTURING AN OPTICAL FILTER

TECHNICAL FIELD

Various embodiments relate generally to optical filters, irradiation devices including optical filters, and methods of manufacturing optical filters.

BACKGROUND

The propagation of light through complex dielectric systems has become the subject of intense research in the past few years. Among complex dielectric systems quasicrystals, in particular quasicrystals of the Fibonacci type have attracted the interest of scientists due to their extraordinary characteristics in view of their interaction with light (Luca Dal Negro, 2003).

By the interaction with quasicrystals, in particular with quasicrystals of the Fibonacci type, light with a well-defined polarization state and a well-defined angular-momentum distribution can be generated. This in turn offers the opportunity of a well-defined interaction of a thus generated light beam with matter, e.g., with biological tissue.

Light with a well-defined polarization state and a well-defined angular momentum distribution can be obtained by optical filters.

To make full use of the above-discussed opportunities, robust optical filters are required the optical properties of which do not degrade with time.

SUMMARY

According to one aspect of the present invention, an optical filter is provided. The optical filter may include a substrate made of a material including an optically transparent matrix material and nano-photonic material with icosahedral or dodecahedral symmetry dispersed in the matrix material.

According to another aspect of the present invention, a method of manufacturing an optical filter is provided. The method may include generating a liquid mixture including the matrix material and the nano-photonic material suspended in the mixture, casting the mixture into a mold, solidifying the mixture in the mold, thereby forming the optical filter, and removing the optical filter from the mold.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 is a table showing the energy-symmetry relationship for the icosahedral group;

FIGS. 10A to 10D shows spectra obtained by opto-magnetic imaging spectroscopy (OMIS) from the skin of left (up) and right (down) hands of test persons with an excellent (FIG. 10A), a very good (FIG. 10B), a standard (FIG. 10C), and a non-standard (FIG. 10D) biophysical skin state;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
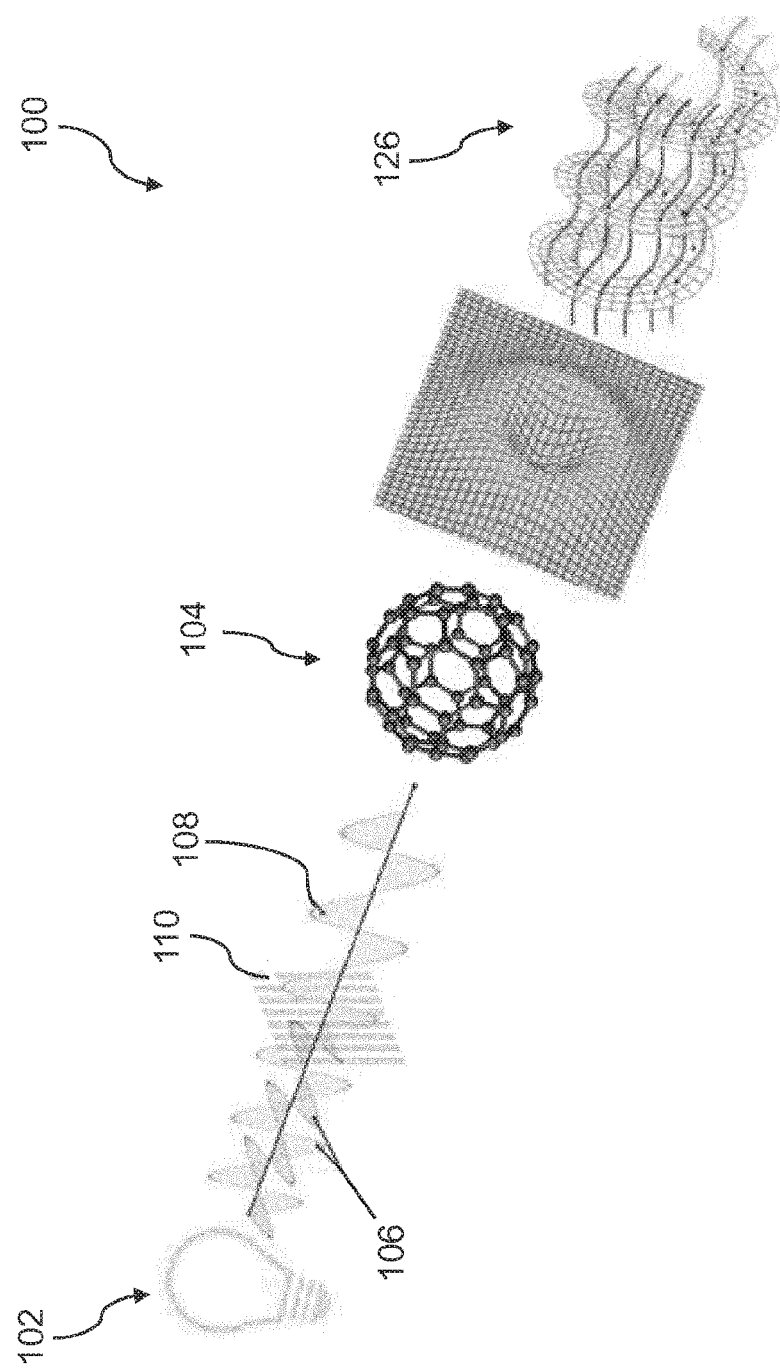
FIG. 1 shows a schematic view of an irradiation device including an optical filter according to the present invention.

FIG. 1 shows a schematic view of an exemplary irradiation device 100. The irradiation device 100 may include a light source 102 and an optical filter 104. The light source 102 may be configured to emit a diffuse non-polarized light beam 106, i.e. a light beam including photons of different energies the polarization states of which are not correlated. In order to convert the non-polarized light beam 106 into a polarized light beam 108, the irradiation device 100 may further include a polarizing element 110 positioned between the light source 102 and the optical filter 104. The polarizing element 110 is configured to pass light waves of a specific polarization and to block light waves of other polarizations. In this way, the light passing through the polarizing element 110 has a well-defined polarization.

In an exemplary irradiation device, the polarizing element 110 may be configured as a linearly polarizing element 110, i.e., a polarizing element that converts the incident light beam 106 into a linearly polarized light beam 108. This is schematically indicated in FIG. 1.

The linearly polarizing element 110 may be configured as an absorptive polarizer or a beam-splitting polarizer. In an absorptive polarizer, light waves with unwanted polarization states are absorbed by the polarizer. Beam splitting polarizers are configured to split the incident light beam into two light beams with different polarization states.

Unlike absorptive polarizers, beam-splitting polarizers do not need to dissipate the energy of the light beam with the unwanted polarization state and are, hence, capable of handling light beams with high intensities.

Beam splitting into two beams with different polarization states may be implemented by reflection. When light reflects at an angle from an interface between two transparent materials, the reflectivity is different for light polarized in the plane of incidence and light polarized perpendicular to it. At a special angle of incidence, the entire reflected light is polarized in the plane perpendicular to the plane of incidence. This angle of incidence is known as Brewster's angle. A polarizer based on this polarization scheme is referred to as Brewster polarizer.

In an exemplary embodiment, the linearly polarizing element 110 may be configured as a Brewster polarizer. In this way, a beam of linearly polarized light may be provided by a simple setup, and, as mentioned above, since no light energy has to be dissipated in the polarizing element 110, the linearly polarizing element 110 is capable of handling large light intensities.

Figure 2:
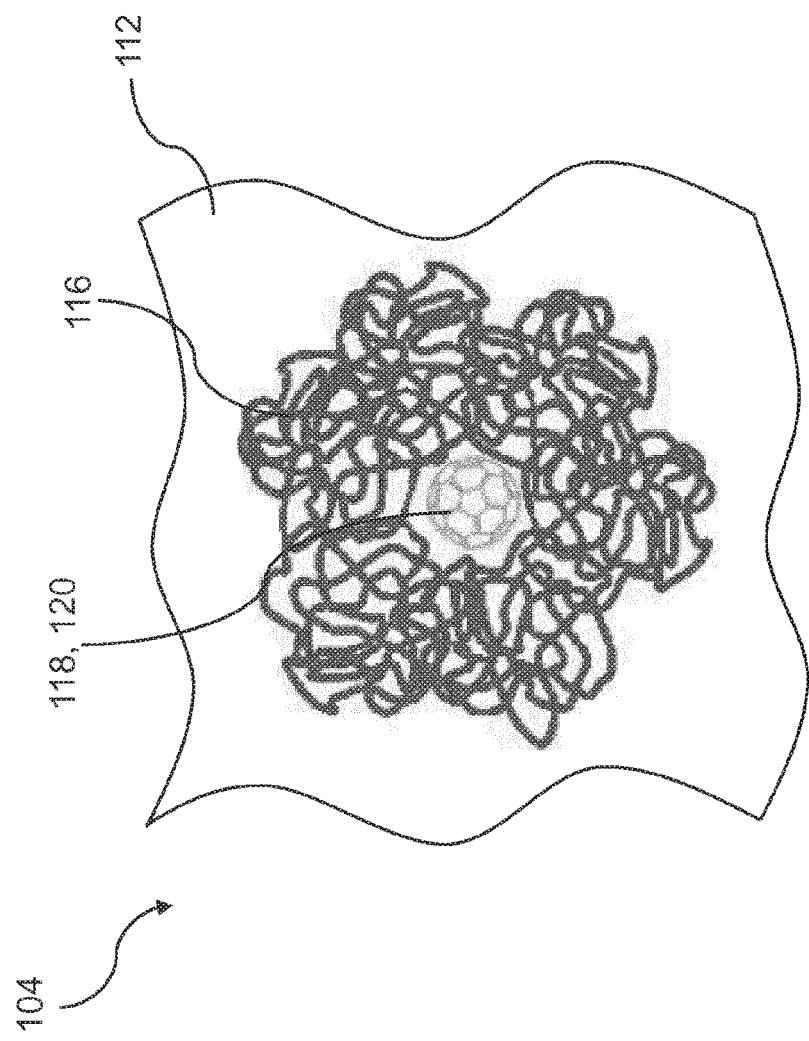
FIG. 2 shows a portion of the optical filter.

A portion of the optical filter 104 is schematically shown in FIG. 2. The optical filter 104 may include a substrate 112 made of a material including an optically transparent matrix material 116 and nano-photonic material 118 with icosahedral or dodecahedral symmetry dispersed in the matrix material 116.

The nano-photonic material 118 may include nano-photonic particles 120 dispersed in the matrix material 116. The nano-photonic material 120 may include fullerene molecules such as $C_{60}$ or higher fullerenes with icosahedral/dodecahedral symmetry.

The nano-photonic material 118 being dispersed in the matrix material 116 means in this context that at least some of the nano-photonic particles 120 are embedded in the matrix material 116, i.e. that they are entirely surrounded by the matrix material 116. In an exemplary optical filter 104 most of the nano-photonic particles 120 or even all nano-photonic particles 120 are embedded in the matrix material 116. In an exemplary optical filter 104, the nano-photonic material 118 is homogeneously distributed throughout the matrix material 116.

Since the nano-photonic material 118 is dispersed in the matrix material 116, it is highly efficiently protected from external influences, thereby preventing the nano-photonic content of the optical filter 104 from altering with time which would inevitably alter the optical properties of the optical filter 104. In this way, a robust optical filter 104 with reliable optical properties is provided.

The mass fraction of the nano-photonic material 118 in the substrate 112 may range from about $1 \cdot 10^{-3}$ to 0.3. In an exemplary embodiment, the mass fraction of the nano-photonic material 118 in the substrate 112 may be about $1.75 \cdot 10^{-3}$.

The matrix material 116 may be optically transparent in the visible and/or the infrared wavelength range.

The matrix material may include at least one of glass and plastic. The plastic may be a thermoplast. In an exemplary optical filter 104 the matrix material 116 may include or may be entirely made of poly(methyl methacrylate) (PMMA). PMMA is a strong and lightweight material. It has a density of 1.17-1.20 g/cm$^3$, which is less than half of the density of glass. In addition, PMMA has a high transmittivity for light of up to 90% which is of special relevance for its employment as a matrix material 116 of an optical filter.

Turning now to the working principle of the optical filter 104. As previously mentioned, the nano-photonic material 118 may include fullerenes such as $C_{60}$. $C_{60}$ is composed of 60 carbon atoms ordered in 12 pentagons and 20 hexagons.

$C_{60}$ has two bond lengths. A first bond length is along the edges of two hexagons and the second bond length is between the edge of a hexagon and a pentagon, the first bond length being greater than the second bond length.

$C_{60}$ is a molecule that exhibits both classical and quantum mechanical properties (Markus Arndt et al, Wave-particle duality, Science, Vol. 401, pp. 680-682, 1999). $C_{60}$ has a diameter of about 1 nm. $C_{60}$ molecules rotate in the solid state, e.g. in a crystal or a thin film, about $3 \cdot 10^{10}$ times per second and in a solution about $1.8 \cdot 10^{10}$ times per second. The rotation of a $C_{60}$ molecule is anisotropic (in all directions). $C_{60}$ clusters are molecular crystal (quasicrystals) of the Fibonacci type.

Quasicrystals are non-periodic structures that are constructed following a simple deterministic rule. A Fibonacci quasicrystal is a deterministic aperiodic structure that is formed by stacking two different compounds A and B according to the Fibonacci generation scheme: $S_{j+1} = \{S_{j-1}, S_j\}$ for $j \geq 1$, with $S_0 = \{B\}$ and $S_1 = \{A\}$. The lower order sequences are $S_2 = \{BA\}$, $S_3 = \{ABA\}$, $S_4 = \{BAABA\}$ etc.

In addition to its spatial structure that is configured according to the Fibonacci scheme, $C_{60}$ has also energy eigenstates that follow the Fibonacci scheme. The energy eigenstates together with the corresponding symmetry elements of $C_{60}$ are depicted in the multiplication table of FIG. 3. One of the crucial properties of $C_{60}$ is based on the energy eigenstates $T_{1g}$, $T_{2g}$, $T_{1u}$, and $T_{2u}$ for the symmetry elements $C_5$, $C_5^2$, $S_{10}$, and $S_{10}^3$ that are consistent with the golden ratio.

In mathematics, two quantities are in the golden ratio $\Phi$, if their ratio is the same as the ratio of their sum to the larger of the two quantities. $\Phi$ can be expressed mathematically as $\Phi = (1+\sqrt{5})/2 \approx 1.62$.

By resonant emission of the above eigenstates of $C_{60}$, incident linearly polarized light is transformed into hyperpolarized light. More specifically, hyperpolarized light may be generated as a resonant emission of the energy eigenstates $T_{1g}$, $T_{2g}$, $T_{1u}$, and $T_{2u}$ of $C_{60}$. Photons with those energy states with symmetry $C_5$, $C_5^2$, $S_{10}$ and $S_{10}^3$ (FIG. 3) are ordered not in linear plane but into curved level with angle that follow Fibonacci law ("sunflower").

Figure 4B:
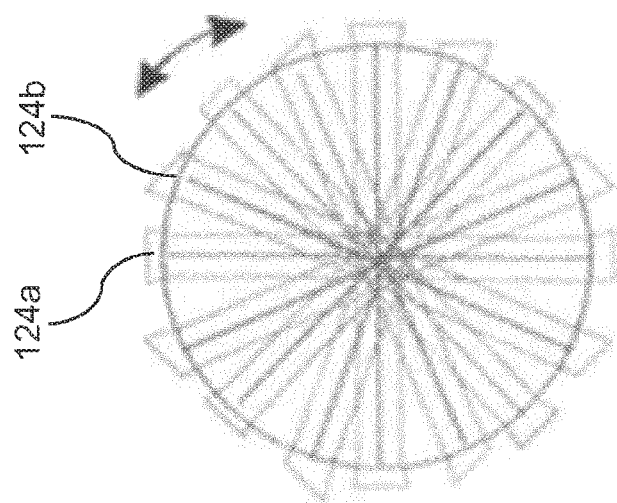
FIG. 4B is a schematic illustration of the angular momentum distribution of the linearly polarized light shown in FIG. 4A.

The differences between linearly polarized light and hyperpolarized light will be subsequently explained with reference to FIGS. 4A, 4B and 5.

Figure 4A:
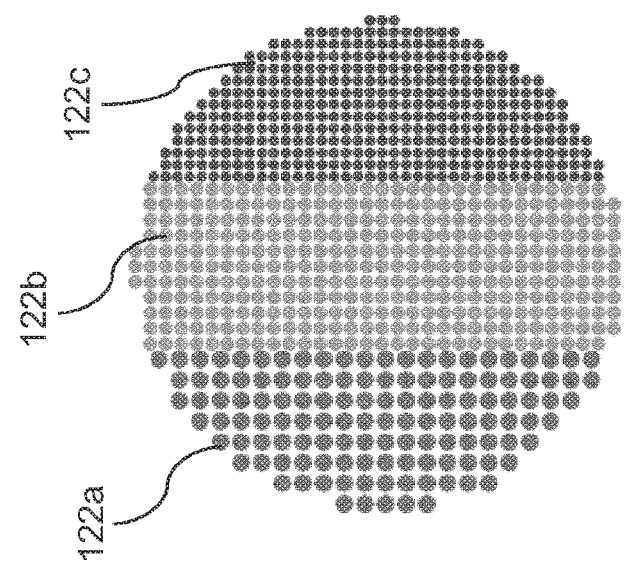
FIG. 4A is a schematic illustration of linearly polarized light.

FIG. 4A schematically illustrates the nature of linearly polarized light for three different wavelengths 122a, 122b, 122c which are aligned in straight adjacent planes parallel to the propagation direction. The photons are ordered by wavelength, however, not ordered in view of their angular momenta (left and right). This is schematically shown in FIG. 4B. In FIG. 4B reference characters 124a and 124b denote photons of different angular momenta. As can clearly be seen in FIG. 4B, the angular momenta of the photons in linearly polarized light are entirely diffuse.

Figure 5:
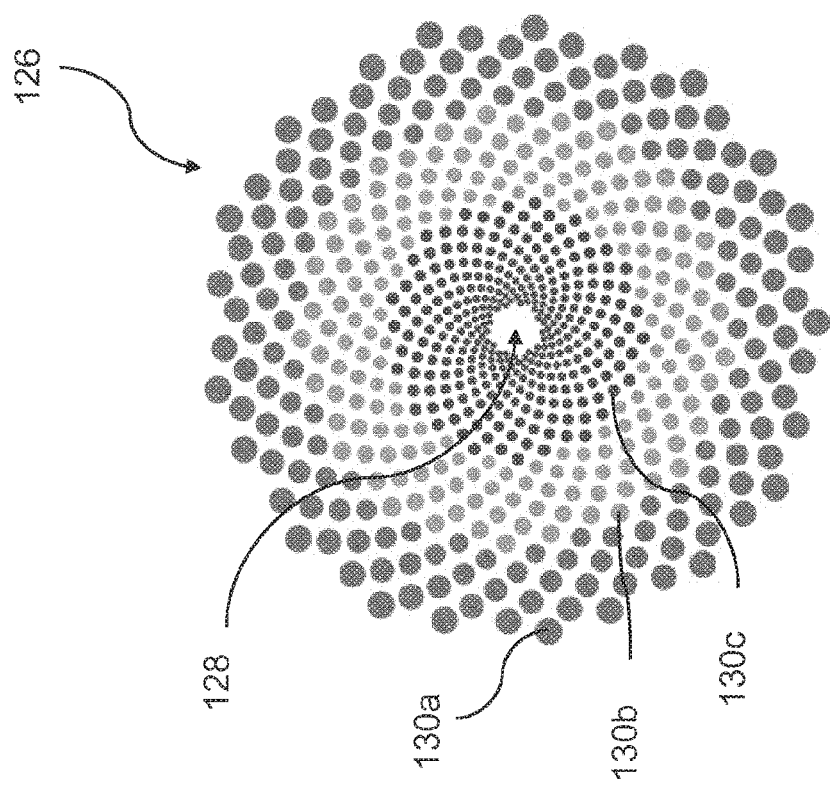
FIG. 5 is a schematic illustration of hyperpolarized light.

FIG. 5 schematically illustrates the nature of hyperpolarized light 126. In FIG. 5, photons of numerous different wavelengths emanate from a central point 128 and are ordered by both wavelength and angular momentum along respective spirals.

The spiral pattern of photons with different angular momenta is similar to a sunflower seed pattern. The seeds in a sunflower are arranged in spirals, one set of spirals being left handed and one set of spirals being right handed. The number of right-handed spirals and the number of left-handed spirals are numbers in the Fibonacci series. The Fibonacci generation scheme was defined above with respect to quasicrystals. This generation scheme is derived from the fundamental Fibonacci series which is given by: 0, 1, 1, 2, 3, 5, 8, 13, 21, 34, 55 . . . The next numbers in the Fibonacci series can be calculated by adding up the respective two preceding numbers in the series. The ratio of a number in the Fibonacci series to the immediately preceding number is given by the golden ration $\Phi$.

The number of the right-handed spirals and left-handed spirals associated with angular momentum in hyperpolarized light shown in FIG. 5 is also determined by the Fibonacci series. More specifically, in FIG. 5, 21 left-handed and 34 right-handed spirals can be found, which are both numbers in the Fibonacci series. Hyperpolarized light is therefore also referred to as "golden light".

In addition, as can also be clearly seen in FIG. 5, in each spiral photons 130a, 130b, 130c of different wavelength are linearly polarized in adjacent parallel planes.

Hyperpolarized light with the above characteristics is generated by the interaction of the linearly polarized light 108 generated by the polarizing element 110 with the nano-photonic material 118 present in the optical filter 104. More specifically, hyperpolarized light is generated by the interaction with the nano-photonic material 118 with icosahedral symmetry like $C_{60}$ or nano-photonic material with dodecahedral symmetry present in the optical filter 104.

Figure 6:
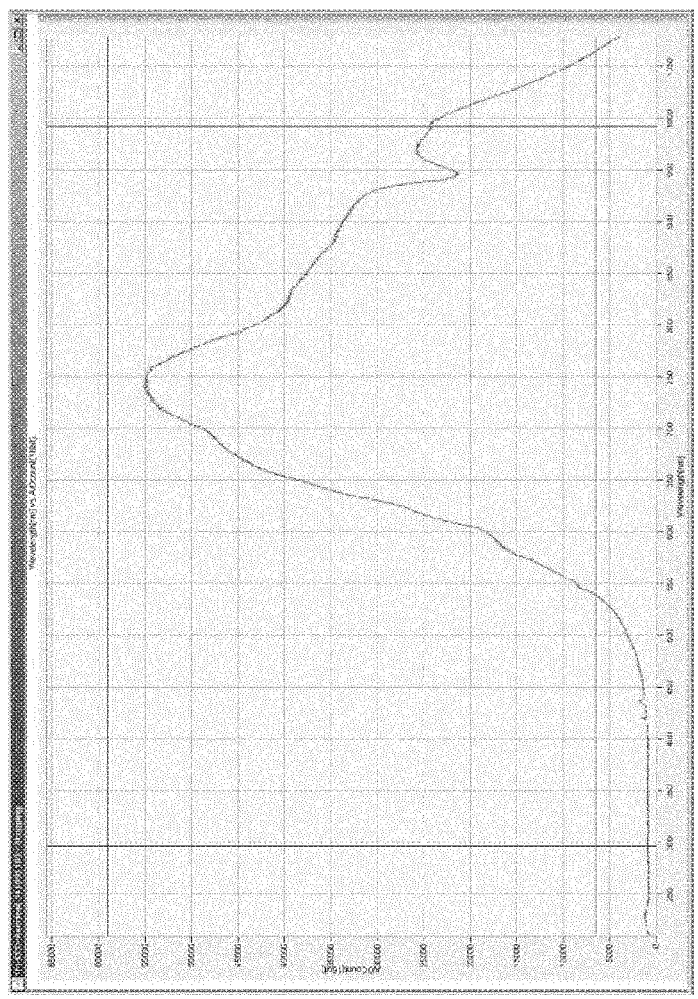
FIG. 6 shows a spectrum of hyperpolarized light.
Figure 7:
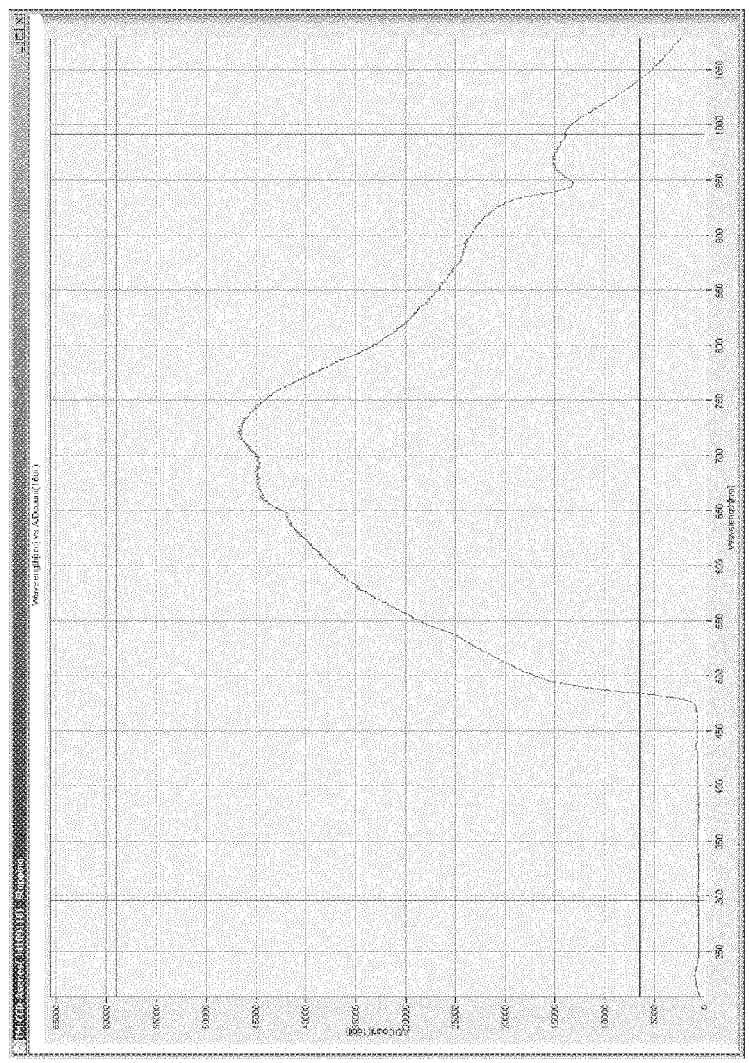
FIG. 7 shows a spectrum of linearly polarized light after passage through an ordinary yellow filter.
Figure 8:
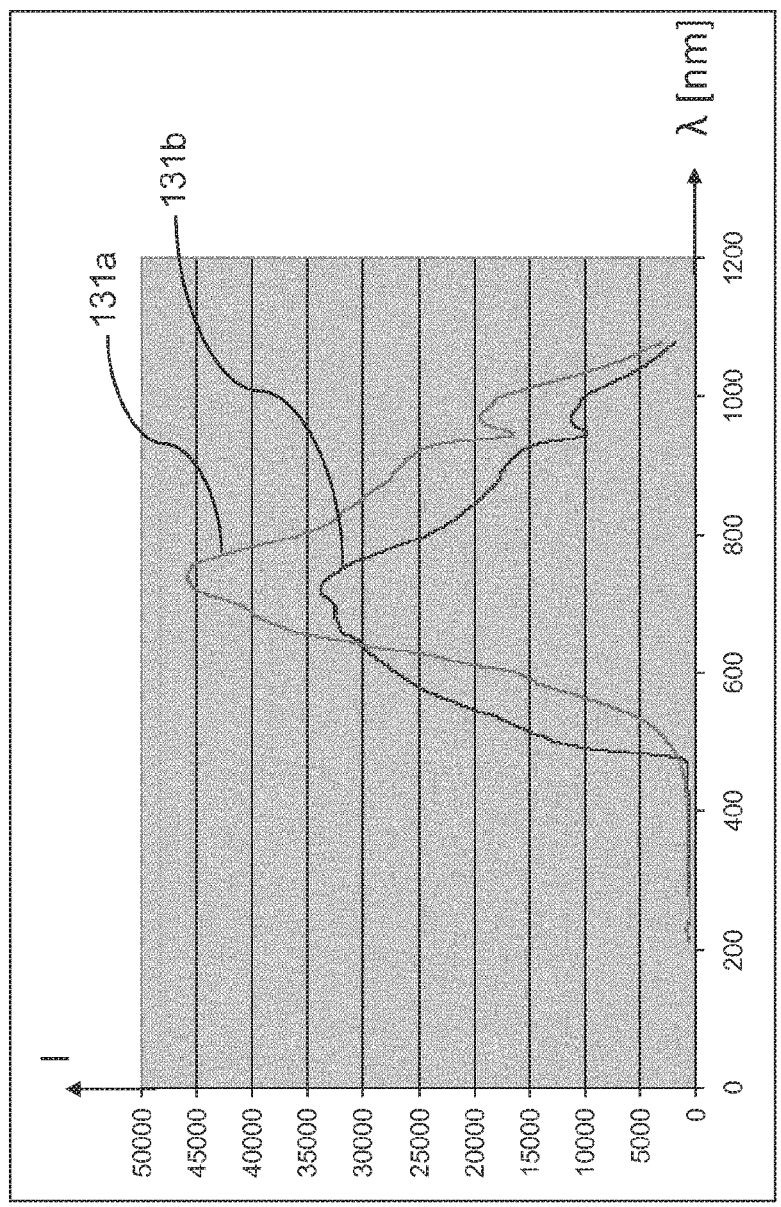
FIG. 8 shows the combined spectra of FIGS. 6 and 7.

The spectrum of light after passing through the optical filter 104, i.e. of hyperpolarized light, is depicted in FIG. 6. The spectrum of linearly polarized light after passing through a comparative ordinary yellow filter is shown in FIG. 7. Both spectra are depicted in the same plot in FIG. 8. In FIG. 8 reference numeral 131a denotes the spectrum of hyperpolarized light and reference numeral 131b the spectrum of linearly polarized light after passage through the ordinary yellow filter.

The intensity distribution in FIGS. 6 to 8 is depicted for a wavelength range from about 200 nm to about 1100 nm, i.e. from the UV to the near infrared.

As shown in FIGS. 6 and 8, the optical filter 104 suppresses wavelengths below about 400 nm and has a low transmittance in the blue wavelength range. The maximum transmittance of the optical filter 104 is at about 740 nm which is favorable for an efficient stimulation of biological tissue due to a higher penetration depth as compared to blue and ultraviolet light.

As shown in FIGS. 7 and 8, the comparative ordinary yellow filter suppresses wavelengths below about 475 nm (ultraviolet and blue light). The maximum transmittance of the comparative ordinary yellow filter is at about 720 nm which is close to the wavelength of maximum transmittance of the optical filter 104.

Even though the optical filter 104 according to the present invention and the comparative ordinary yellow filter have their maximum transmittance at a similar wavelength, the optical filter 104 according to the present invention has a higher integral transmittance in the red and infrared wavelength range from 660 to 1100 nm, as can clearly be seen in FIG. 8.

Yet from this reason, an optical filter 104 according to the present invention enables a more efficient stimulation of biological tissue as compared to the comparative ordinary yellow filter. An even more important advantage of an optical filter 104 according to the present invention in view of biological tissue stimulation arises from its ability of generating hyperpolarized light, whose interaction with biological tissue, in particular with collagen, is, in contrast to linearly polarized light, mainly of quantum mechanical nature.

Collagen is an extracellular protein and makes up about 30% of the human skin. Collagen and water making up about 60-65% of the human skin are the main components of human skin. Therefore, the biophysical state of the human skin is mainly determined by the interaction between water and collagen.

Figure 9:
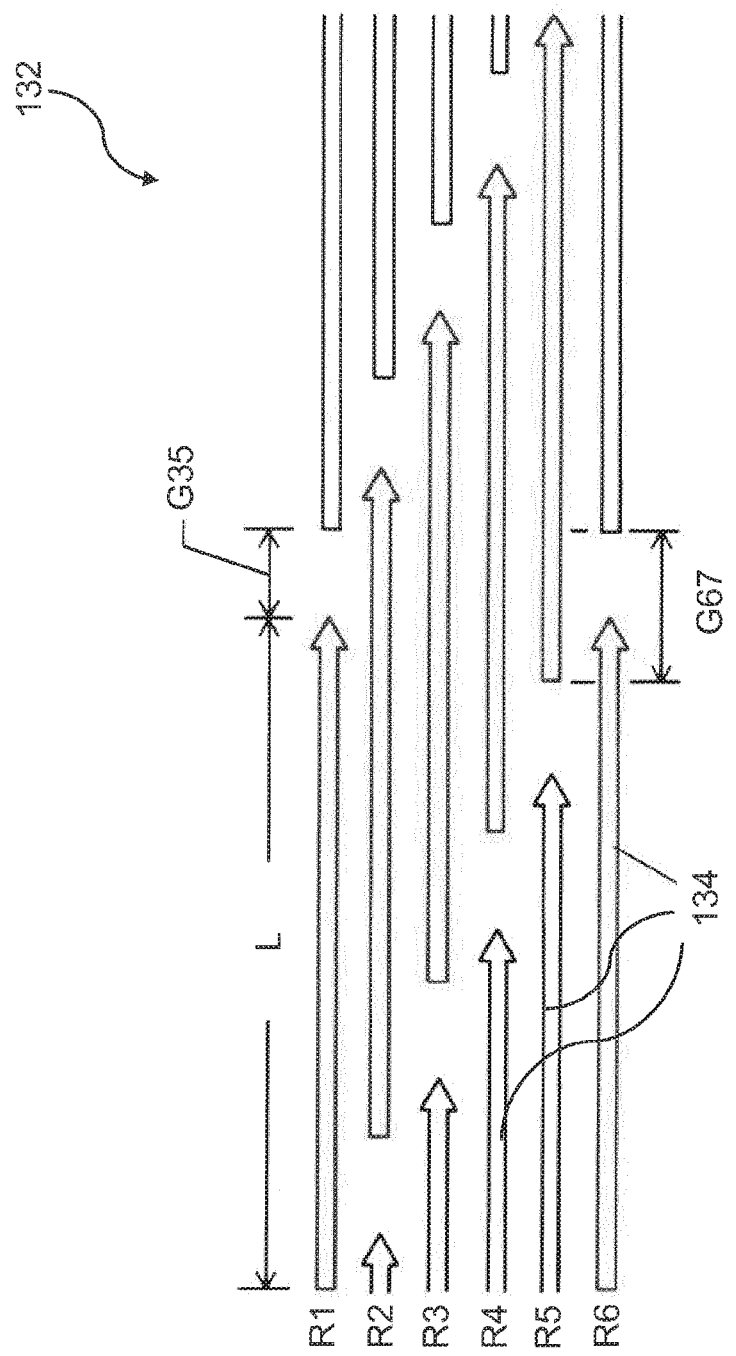
FIG. 9 shows a schematic view of a portion of a collagen fibril.

FIG. 9 shows a schematic view of a portion of a collagen fibril 132 including a plurality of collagen molecules 134 shown as arrows. As can be seen in FIG. 9, the collagen molecules are arranged in a plurality of rows R1-R6. The length L of an individual collagen molecule is about 300 nm. Adjacent collagen molecules 134 in immediately adjacent rows are displaced by a 67 nm gap G67. Immediately adjacent collagen molecules 134 in the same row are displaced by a 35 nm gap G35.

The biophysical state of collagen is determined by the oscillation states of peptide planes. The oscillation of one peptide plane is determined by the oscillations of two neighboring peptide planes. The ratio of oscillation frequencies of neighboring planes is given by the golden ratio $\Phi$. Therefore, the oscillation behavior of the peptide planes of collagen can be influenced by photons ordered in view of their angular momenta according to the Fibonacci law, e.g. by hyperpolarized light.

Collagen in the extracellular space is linked via Integrin and Cytoskeloton proteins with the nucleus and, hence, with the DNA. Therefore, the opportunity exists to influence the cellular nucleus by means of hyperpolarized light by the intermediary of collagen in the extracellular space.

The influence of hyperpolarized light on the state of the human skin has been investigated with 30 test persons. Prior to exposing the skin of the test persons to hyperpolarized light, the skin states of left and right hands of the test persons were characterized by opto-magnetic imaging spectroscopy (OMIS). Then, after exposing the skin of the test persons to hyperpolarized light and to linearly polarized light, as a comparative example, for 10 minutes, the skin has been again characterized by OMIS to investigate the respective influences of linearly polarized light and hyperpolarized light on the skin.

OMIS is a diagnostic technique based on the interaction of electromagnetic radiation with valence electrons within the sample material, capable of examining the electronic properties of the sample material. In this way, paramagnetic and diamagnetic properties of the sample material (unpaired/paired electrons) can be obtained.

The physical background of OMIS will be shortly discussed in the following. More details on OMIS can be found in D. Koruga et al., "Epidermal Layers Characterisation by Opto-Magnetic Spectroscopy Based on Digital Image of Skin", Acta Physica Polonica A, Vol. 121, No. 3, p. 606-610 (2012), or in D. Koruga et al. "Water Hydrogen Bonds Study by Opto-Magnetic Fingerprint", Acta Physica Polonica A, Vol. 117, No. 5, p. 777-781 (2010), or in L. Matija, "Nanophysical approach to diagnosis of epithelial tissues using Opto-magnetic imaging spectroscopy", p. 156-186 in "Nanomedicine", Eds. Alexander Seifalian, Achala del Mel and Deepak M. Kalaskar, ONE CENTRAL PRESS, Manchester, UK (2015), or in P.-O. Milena et al., "Opto-Magnetic Method for Epstein-Barr Virus and Cytomegalovirus Detection in Blood Plasma Samples" Acta Physica Polonica A, Vol. 117, No. 5, p. 782-785 (2010).

Light as an electromagnetic wave has an electric and a magnetic wave perpendicular to each other. By polarizing light, the magnetic and electric waves can be split. One particular type of polarization occurs for light incident under the Brewster's angle which has been discussed above. This angle is characteristic for the materials present in the irradiated sample.

Since the electric component can be selectively detected, the magnetic component can be determined by subtracting the intensity of the reflected polarized light (electric component) from the intensity of the reflected white light. From the thus obtained magnetic component magnetic properties of the analyzed sample can be derived.

Typical spectra obtained by OMIS include a plurality of positive and negative peaks, the negative peaks representing the diamagnetic properties of the sample material, while the positive peaks representing the paramagnetic properties of the sample material.

The results of the characterizing measurements of the skin of left and right hands of the 30 test persons obtained by OMIS are shown in FIGS. 10A to 10D. In these plots, the abscissa corresponds to the wavelength difference measured in nm, and the ordinate to the intensity in arbitrary units (a.u.). In the upper plots of these figures the results for respective left hands are shown, while in the lower plots the results for respective right hands are shown.

FIG. 10A shows the results of a test person whose skin is characterized as having an "excellent" biophysical skin state due to the pronounced peaks seen in this plots that are similar for both hands. The biophysical skin state of 4 test persons has been classified as "excellent".

FIG. 10B shows the results of a test person whose skin is characterized as having a "very good" biophysical skin state due to the still pronounced peaks seen in this plots that are similar for both hands. The biophysical skin state of 16 test persons has been classified as "very good".

FIG. 10C shows the results of a test person whose skin is characterized as having a "standard" biophysical skin state. As can be seen in FIG. 10C, the peaks are less pronounced as compared to the excellent and very good states shown in FIGS. 10A and 10B. In addition, there are significant differences between the spectra of both hands of the respective test person. The biophysical skin state of 8 test persons has been classified as "standard".

FIG. 10D shows the results of a test person whose skin is characterized as having a "non-standard" biophysical skin state. As can be seen in FIG. 10D, the peaks are less pronounced as compared to the excellent and very good states shown in FIGS. 10A and 10B. In addition, there are very pronounced differences between the spectra. The biophysical skin state of 2 test persons has been classified as "non-standard".

Since the spectra obtained from test persons having an excellent and a very good biophysical skin state are not suitable for a comparison between the effects achievable by the irradiation with linearly polarized and hyperpolarized light, since the biophysical skin state can hardly be improved, a detailed discussion will be subsequently given only with respect to test persons with a standard and non-standard biophysical skin state.

Figure 11B:
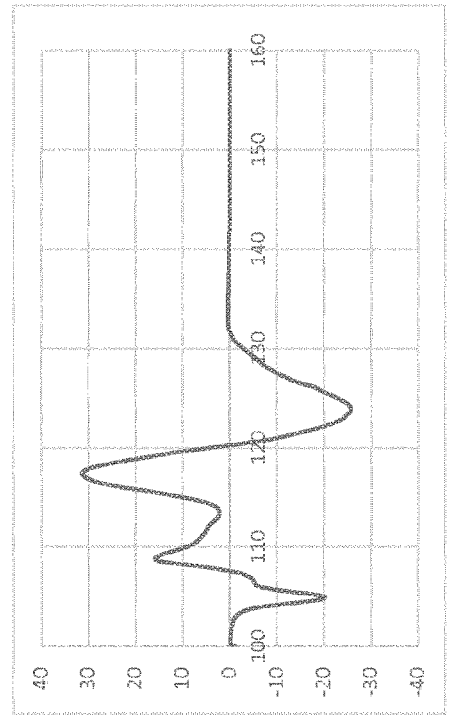
FIG. 11B shows an OMIS spectrum of the skin of the right hand of the test person with the standard biophysical skin state before the irradiation with hyperpolarized light.
Figure 12B:
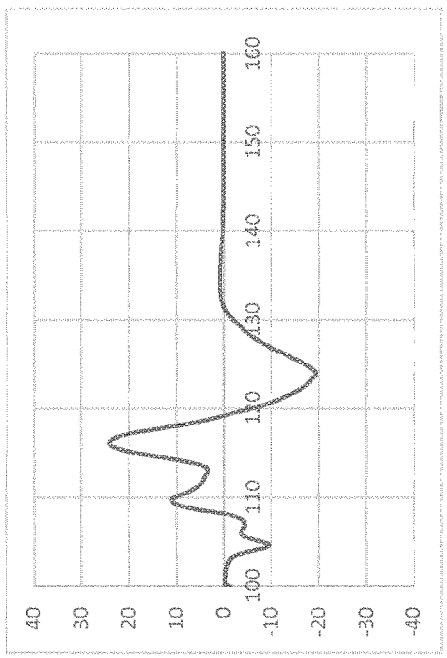
FIG. 12B shows an OMIS spectrum of the skin of the right hand of the test person with the standard biophysical skin state after irradiation with hyperpolarized light.
Figure 11A:
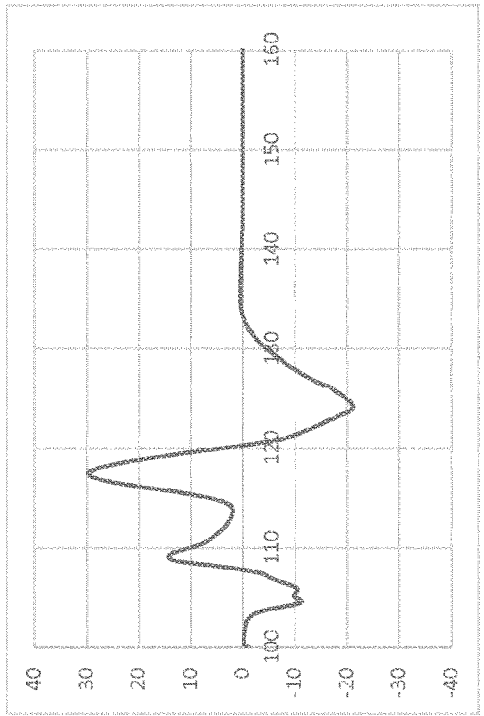
FIG. 11A shows an OMIS spectrum of the skin of the left hand of a test person with a standard biophysical skin state before the irradiation with linearly polarized light.
Figure 12A:
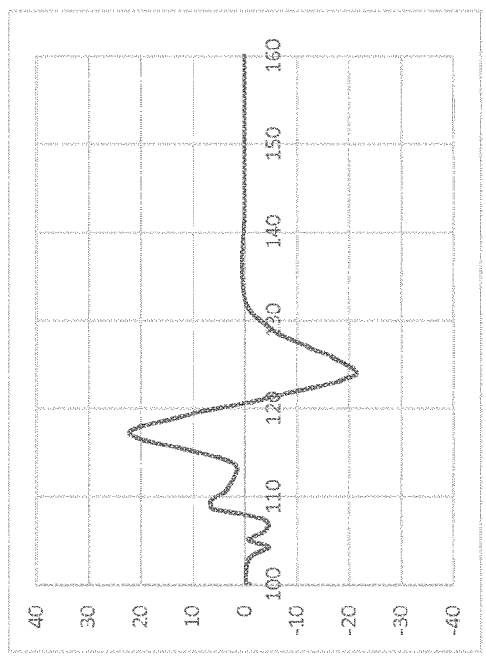
FIG. 12A shows an OMIS spectrum of the skin of the left hand of the test person with the standard biophysical skin state after irradiation with linearly polarized light passed through an ordinary yellow filter.

FIGS. 11A and 11B show OMIS spectra representing the biophysical skin state of the left and right hands, respectively, of a test person with a standard biophysical skin state before irradiation. FIGS. 12A and 12B show OMIS spectra representing the biophysical skin state of the left and right hands, respectively, of the test person with the standard biophysical skin state after irradiation with linearly polarized and hyperpolarized light, respectively. FIG. 12A shows an OMIS spectrum of the skin of the left hand after irradiation with linearly polarized light and FIG. 12B shows an OMIS spectrum of the skin of the right hand after irradiation with hyperpolarized light.

The effect of linearly polarized light on the biophysical skin state of a test person with a standard biophysical skin state can be deducted from a comparison of FIGS. 11A and 12A.

As shown in these figures, the wavelength difference (WLD) of the peaks is similar before and after irradiation. This indicates that both the collagen and the water-collagen complex in the skin of the respective test person are stable.

Regarding the peaks with a WLD of 103-110 nm, there is a change in shape and intensity (from about −4.3 to −9.15 a.u.) that is indicative of a normal collagen gap of 35 nm.

Between a WLD of 110-120 nm a slight change in shape and intensity (from 6.25 to 10.94 a.u. and from 21.6 to 23.56 a.u.). There is also a slight shift of this peak from 121.4 to 119.1 nm that indicates that the collagen-water complex is stable.

Between a WLD of 120-130 nm, the intensity of the peak changes from −21.7 to −19.6 a.u. This indicates that the dynamics of the collagen gap of 67 nm is not satisfactory.

The effect of hyperpolarized light on the biophysical skin state of the test person with the standard biophysical skin state can be seen from a comparison of FIGS. 11B and 12B.

As shown in these figures, the wavelength difference (WLD) of the peaks is similar before and after irradiation. This indicates that both the collagen and the water-collagen complex in the skin of the respective test person are stable.

Regarding the peaks with a WLD of 103-110 nm, there is a huge change in shape and intensity (from about −11.0 to −20.25 a.u.) that is indicative of a very good dynamics of the collagen gap of 35 nm.

Between a WLD of 110-120 nm there is no change in shape and intensity of the respective peak. The WLD of this peak is not changed, either, which is indicative of a very stable collage-water complex.

Between a WLD of 120-130 nm the intensity of the peak changes from −21.4 to −25.6 a.u. This indicates that the dynamics of the collagen gap of 67 nm is good enough.

Figure 13A:
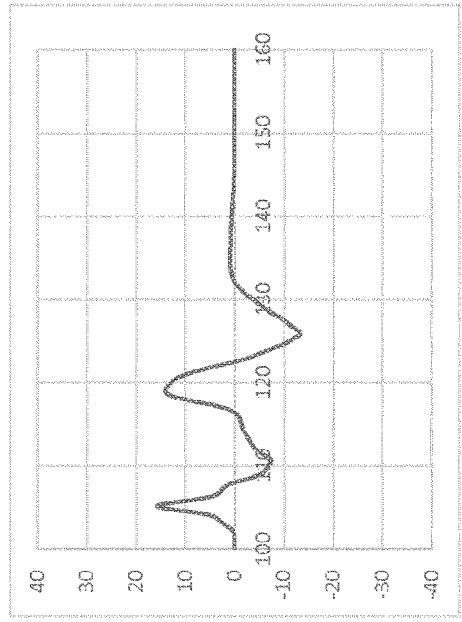
FIG. 13A shows an OMIS spectrum of the skin of the left hand of a test person with a non-standard biophysical skin state before irradiation with linearly polarized light.
Figure 13B:
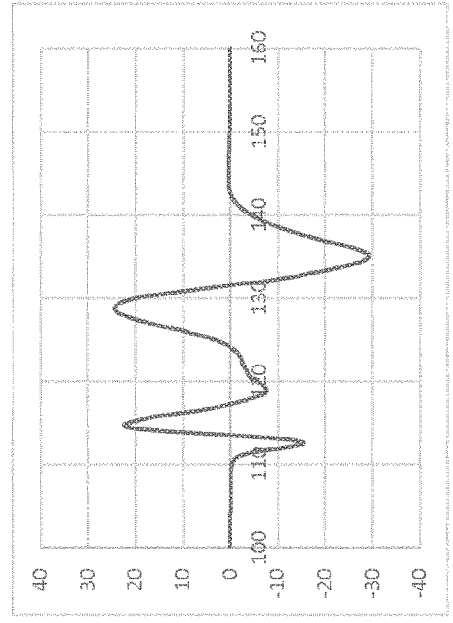
FIG. 13B shows an OMIS spectrum of the skin of the right hand of the test person with the non-standard biophysical skin state before the irradiation with hyperpolarized light.
Figure 14A:
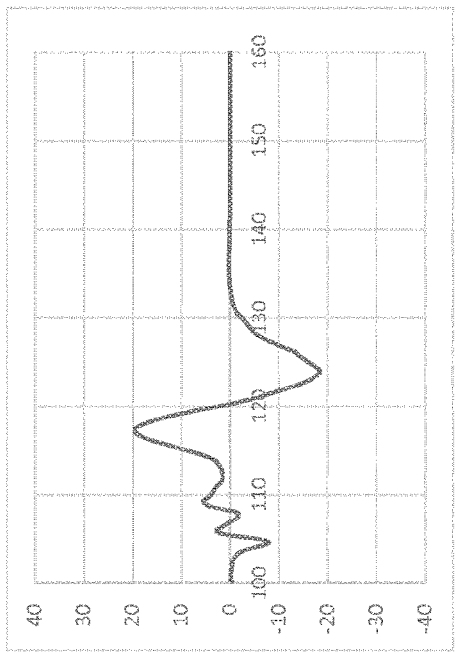
FIG. 14A shows an OMIS spectrum of the skin of the left hand of the test person with the non-standard biophysical skin state after irradiation with linearly polarized light passed through an ordinary yellow filter.
Figure 14B:
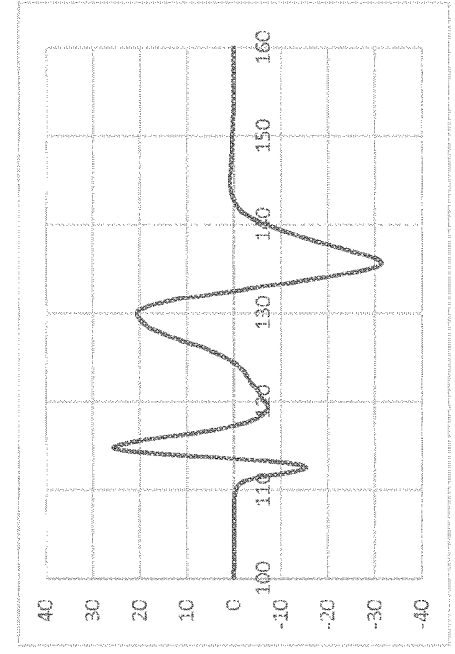
FIG. 14B shows an OMIS spectrum of the skin of the right hand of the test person with the non-standard biophysical skin state after irradiation with hyperpolarized light.

FIGS. 13A and 13B show OMIS spectra representing the biophysical skin state of the left and right hands, respectively, of a test person with a non-standard biophysical skin state before irradiation. FIGS. 14A and 14B show OMIS spectra representing the biophysical skin state of the left and right hands, respectively, of the test person with the non-standard biophysical skin state after irradiation, wherein FIG. 14A shows the OMIS spectrum of the skin of the left hand after irradiation with linearly polarized light and FIG. 14B shows the OMIS spectrum of the skin of the right arm after irradiation with hyperpolarized light.

The effect of linearly polarized light on the biophysical skin state of the test person with the non-standard biophysical skin state can be seen from a comparison of FIGS. 13A and 14A.

As shown in these figures, the wavelength difference (WLD) of the peaks is similar before and after irradiation. This indicates that both the collagen and the water-collagen complex in the skin of the respective test person are unsatisfactory.

Regarding the peaks with a WLD of 103-110 nm there is a change in shape and intensity (from about −8.2 to −15 a.u.), however, with a large WLD shift of 8 nm from 104 to 112 nm that is indicative of an unsatisfactory dynamics of the collagen gap of 35 nm.

Between a WLD of 110-120 nm there is a significant change both in shape and intensity (from 20.00 to 27.15 a.u.).

In addition, a new peak arises at a WLD of about 130 nm. Furthermore, there is a shift of the negative peak from 124.00 nm to 136.20 nm with a huge intensity difference from −19.4 to −31.5 a.u. This is indicative of an unstable collagen-water complex. Furthermore, the WLD range is extended which indicative of an unsatisfactory dynamics of the collagen gap of 67 nm.

The effect of hyperpolarized light on the biophysical skin state of the test person with the non-standard biophysical skin state can be seen from a comparison of FIGS. 13B and 14B.

As shown in these figures, there is a huge shift in wavelength difference (WLD) of 10 nm of the peaks before and after irradiation. This indicates that both the collagen and the water-collagen complex in the skin of the respective test person are not stable.

Regarding the peaks with a WLD of 103-110 nm, there is a significant change of the spectrum leading to a pronounced positive and negative peak. This means that by the irradiation of the skin with hyperpolarized a very good dynamics of the collagen gap of 35 nm could be established Between a WLD of 110-120 nm, there is a huge WLD shift of 10 nm and the intensity and shapes of the peaks changed. This is indicative of an unstable collagen-water complex. Furthermore, the WLD ranges of the two right peaks are shifted from 123 nm to 132 nm and from 132 nm to 142 nm which is indicative of an unsatisfactory dynamics of the collagen gap of 67 nm.

These measurements show that by the irradiation of the skin of persons with a standard and non-standard biophysical skin state, the irradiation of the skin with hyperpolarized light achieves better results, in particular in the range of low WLD.

The efficiency of the conversion of linearly polarized light into hyperpolarized light by the optical filter 104 is about 62% at present. Higher conversion efficiencies are expected to improve the above results.

Subsequently, a method of manufacturing an optical filter 104 according to the present invention will be discussed.

Figure 15:
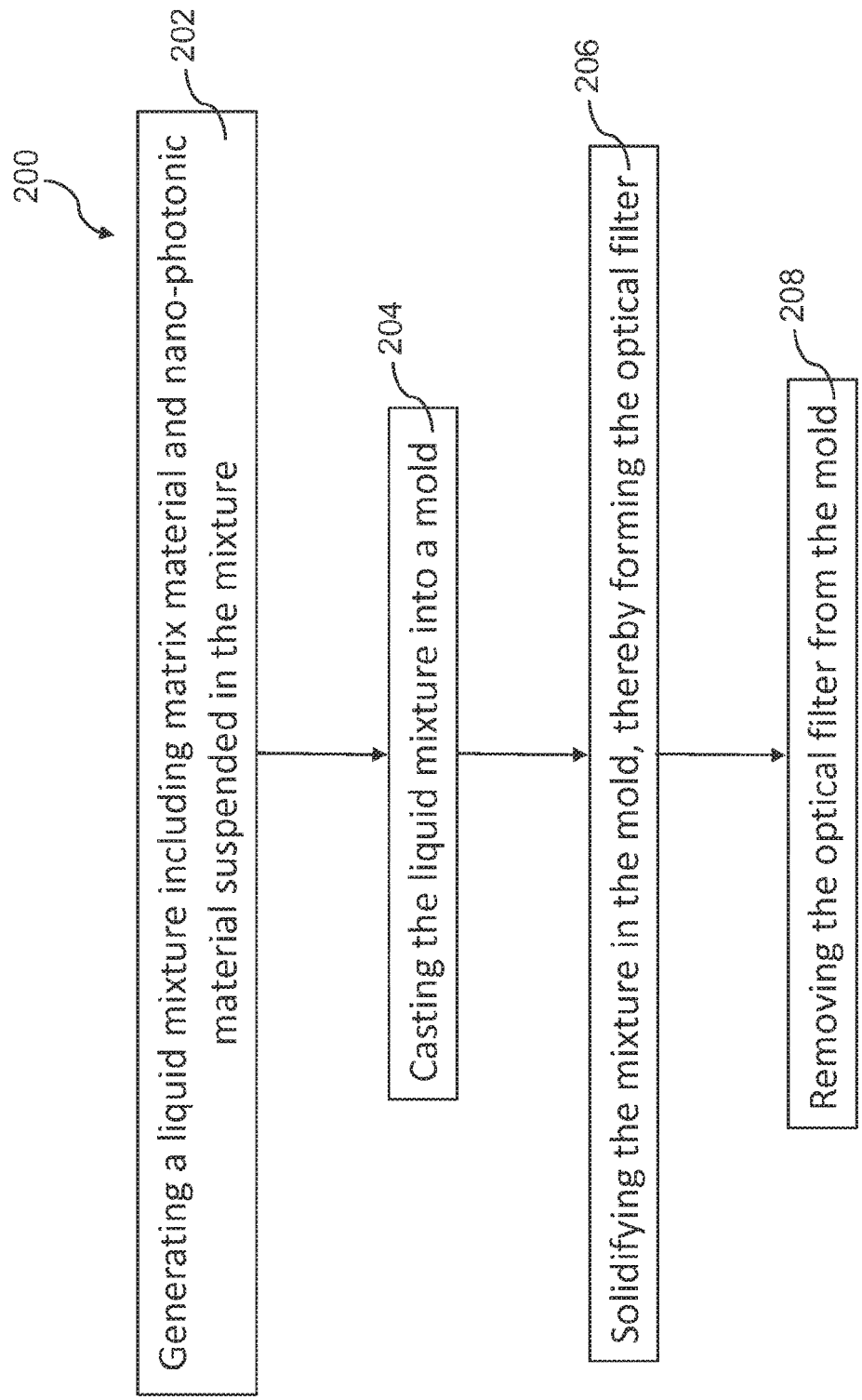
FIG. 15 shows a flow chart of an exemplary method of manufacturing an optical filter.

An exemplary method is shown in the exemplary flow diagram of FIG. 15. The method 200 may include:
generating a liquid mixture including the matrix material and the nano-photonic material with icosahedral or dodecahedral symmetry suspended in the mixture (202),
casting the liquid mixture into a mold (204),
solidifying the mixture in the mold, thereby forming the optical filter (206), and
removing the optical filter from the mold (208).

Figure 16:
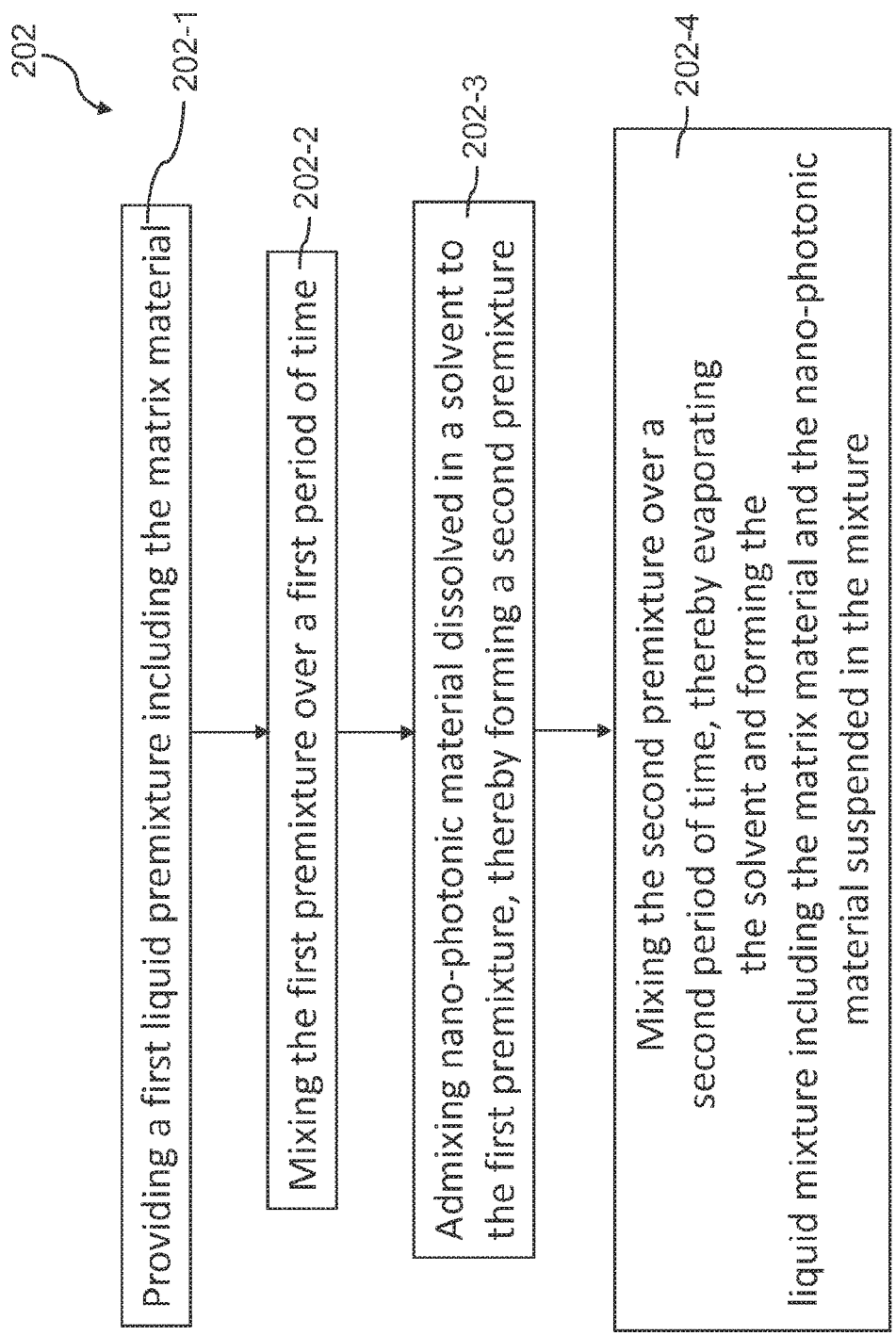
FIG. 16 shows exemplary steps involved in generating a liquid mixture including matrix material and nano-photonic material suspended in the mixture.

An exemplary flow diagram of generating a liquid mixture including the matrix material and the nano-photonic material suspended in the mixture (202) is shown in FIG. 16. The generating the liquid mixture may include:
providing a first liquid premixture including the matrix material (202-1),
mixing the first premixture over a first period of time (202-2),
admixing nano-photonic material dissolved in a solvent to the first premixture, thereby forming a second premixture (202-3), and
mixing the second premixture over a second period of time, thereby evaporating the solvent and forming the liquid mixture including the matrix material and the nano-photonic material suspended in the mixture (202-4).

The nano-photonic material has icosahedral or dodecahedral symmetry and may include $C_{60}$. The matrix material may include poly(methyl methacrylate) (PMMA).

The first premixture may include poly(methyl methacrylate) and methyl methacrylate (MMA). The weight fraction of PMMA in the first premixture may range from 0.7 to 0.9. The weight fraction of MMA in the first premixture may range from 0.1 to 0.3.

The first period of time may be about 24 h. The second period of time may be 96 h. The mixing of the second premixture may be carried out at an enhanced temperature, e.g. 60-75° C. to support the evaporation of the solvent, e.g. of toluene.

The solidifying the mixture in the mold may include heating up the mixture in the mold from a first temperature, e.g. 25° C., up to a second temperature, e.g. 90° C., and then cooling down the mixture to a third temperature, e.g. 25° C. over a predetermined period of time. The predetermined period of time may be 120-140 h. By choosing such a high period of time, the generation of cracks in the thus formed optical filter can be efficiently prevented.

In this way, plate-like blanks having exemplary dimensions of about 1200×1100×2.5 mm³ could be manufactured. From such a blank, optical filters having an exemplary diameter of 50 mm can be cut out.

In FIGS. 17A-17D, the projection of different kinds of light onto a screen is illustrated.

Figure 17B:
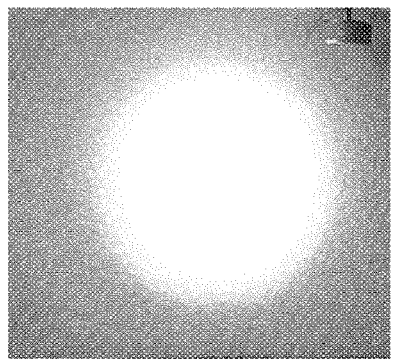
FIGS. 17A-17D show light spots of different kinds of light projected onto a screen.
Figure 17D:
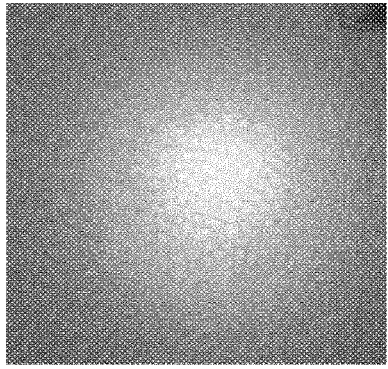
Figure 17A:
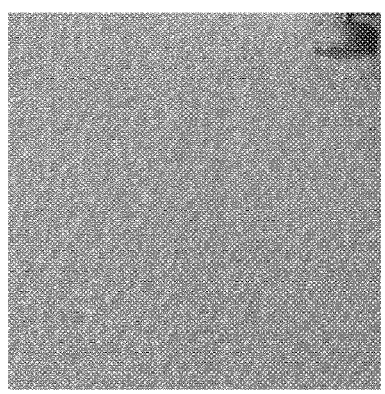

In FIG. 17A, the screen is illuminated by ambient diffuse light.

In FIG. 17B, the screen is illuminated by a linearly-polarized light beam. As shown in FIG. 17B, the projected light spot has a white core area attributable to the polarized content of the light beam. The core area is surrounded by a red ring representing partially polarized red-shifted near-infrared light due to incomplete polarization.

Figure 17C:
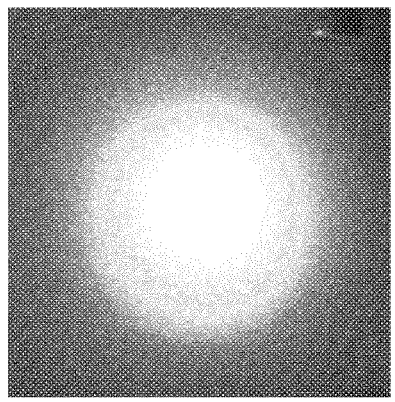

In FIG. 17C, the screen is illuminated by a light beam of linearly polarized light after passage through an ordinary yellow filter. As shown in this figure, the projected light spot has a white core area attributable to the linearly polarized content of the light beam. The core area is surrounded by yellow and red rings of partially polarized light due to impurities in the filter.

In FIG. 17D, the screen is illuminated by a light beam of hyperpolarized light after passage through an optical filter according to the present invention. Here, no pronounced inner white core area is visible, since the linearly polarized light has been transformed into hyperpolarized light. This appears as a red and yellow spot on the screen.

In the following, various aspects of this disclosure will be illustrated:

Example 1 is an optical filter. The optical filter may include a substrate made of a material including an optically transparent matrix material and nano-photonic material with icosahedral or dodecahedral symmetry dispersed in the matrix material.

In Example 2, the subject matter of Example 1 can optionally include that the nano-photonic material includes fullerene molecules.

In Example 3, the subject matter of Example 2 can optionally include that the nano-photonic material includes $C_{60}$ fullerene molecules.

In Example 4, the subject matter of any one of Examples 1 to 3 can optionally include that the matrix material is optically transparent in the visible and/or infrared frequency range.

In Example 5, the subject matter of any one of Examples 1 to 4 can optionally include that the matrix material includes at least one of glass and plastic.

In Example 6, the subject matter of Example 5 can optionally include that the plastic is a thermoplast.

In Example 7, the subject matter of Example 6 can optionally include that the thermoplast is poly(methyl methacrylate).

In Example 8, the subject matter of any one of Examples 1 to 7 can optionally include that the mass fraction of the nano-photonic material in the substrate ranges from about $1 \cdot 10^{-3}$ to 0.3.

In Example 9, the subject matter of Example 8 can optionally include that the mass fraction of the nano-photonic material is about $1.75 \cdot 10^{-3}$.

Example 10 is an irradiation device. The irradiation device may include a light source and an optical filter of any one of Examples 1 to 9.

In Example 11, the subject matter of Example 10 can optionally further include a polarizing element positioned between the light source and the optical filter.

In Example 12, the subject matter of Example 11 can optionally include that the polarizing element is configured as a linearly polarizing element.

In Example 13, the subject matter of Example 12 can optionally include that the linearly polarizing element is configured as a Brewster polarizer.

Example 14 is a method of manufacturing an optical filter of any one of Examples 1 to 9. The method may include: generating a liquid mixture including the matrix material and the nano-photonic material with icosahedral or dodecahedral symmetry suspended in the mixture, casting the mixture into a mold, solidifying the mixture in the mold, thereby forming the optical filter, and removing the optical filter from the mold.

In Example 15, the subject matter of Example 14 can optionally include that the generating the liquid mixture includes: providing a first liquid premixture including the matrix material, mixing the first premixture over a first period of time, admixing nano-photonic material dissolved in a solvent to the first premixture, thereby forming a second premixture, and mixing the second premixture over a second period of time, thereby evaporating the solvent and forming the liquid mixture including the matrix material and the nano-photonic material suspended in the mixture.

In Example 16, the subject matter of any one of Examples 14 or 15 can optionally include that the mixing the second premixture is carried out at a temperature above room temperature.

In Example 17, the subject matter of any one of Examples 14 to 16 can optionally include that the nano-photonic material includes $C_{60}$ and/or higher fullerenes and/or other material with icosahedral and dodecahedral symmetry.

In Examples 18, the subject matter of any one of Examples 14 to 17 can optionally include that the matrix material includes poly(methyl methacrylate).

In Example 19, the subject matter of Example 18 can optionally include that the first premixture includes poly (methyl methacrylate) and methyl methacrylate.

In Example 20, the subject matter of Examples 19 can optionally include that the weight fraction of poly(methyl methacrylate) in the first premixture ranges from 0.7 to 0.9.

In Example 21, the subject matter of any one of Examples 19 or 20 can optionally include that the weight fraction of methyl methacrylate in the first premixture ranges from 0.1 to 0.3.

In Example 22, the subject matter of any one of Examples 14 to 21 can optionally include that the solidifying the mixture in the mold includes heating up the mixture in the mold from a first temperature to a second temperature, and subsequently cooling down the mixture from the second temperature to a third temperature.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An irradiation device comprising:
    a light source,
    an optical filter comprising a substrate made of a material comprising an optically transparent matrix material and nano-photonic material with icosahedral or dodecahedral symmetry dispersed in the matrix material, and
    a Brewster polarizer positioned between the light source and the optical filter and arranged at a Brewster angle with respect to the optical filter so as to reflect light from the light source to the optical filter at the Brewster angle, wherein the light reflected at the Brewster angle is linearly polarized.

2. The irradiation device of claim 1, wherein the nano-photonic material comprises fullerene molecules.

3. The irradiation device of claim 2, wherein the nano-photonic material comprises $C_{60}$ fullerene molecules.

4. The irradiation device of claim 1, wherein the matrix material is optically transparent in the visible and/or in the infrared frequency range.

5. The irradiation device of claim 1, wherein the matrix material comprises at least one of glass and plastic.

6. The irradiation device of claim 5, wherein the plastic is a thermoplast.

7. The irradiation device of claim 6, wherein the thermoplast is poly(methyl methacrylate).

8. The irradiation device of claim 1, wherein the mass fraction of the nano-photonic material in the substrate ranges from about $1 \cdot 10^{-3}$ to 0.3.

9. The irradiation device of claim 8, wherein the mass fraction of the nano-photonic material is about $1.75 \cdot 10^{-3}$.

10. The device of claim 3, wherein the nano-photonic material comprises only $C_{60}$ fullerene molecules.

11. The device of claim 3, wherein the nano-photonic material comprises only $C_{60}$ fullerene molecules or higher fullerenes with icosahedral/dodecahedral symmetry.

12. The device of claim 1, wherein the light source, the Brewster polarizer and the optical filter are not co-linear with each other, wherein the optical filter receives the linearly polarized light and generates hyperpolarized light.

13. The device of claim 12, wherein the hyperpolarized light comprises a set of right-handed spirals and a set of left-handed spirals, wherein the number of right-handed spirals and the number of left-handed spirals are numbers in the Fibonacci series.

14. The device of claim 12, wherein the hyperpolarized light is generated by the interaction of the linearly polarized light with only nano-photonic material with icosahedral symmetry/dodecahedral symmetry present in the optical filter, the hyperpolarized light comprises a spiral pattern of photons with different wavelengths and angular momentums.

15. The device of claim 14, wherein in spirals of the spiral pattern, photons of different wavelengths are linearly polarized in adjacent parallel planes.

* * * * *